UNITED STATES PATENT OFFICE.

ALEXANDER SCHWARCMAN, OF BUFFALO, NEW YORK, ASSIGNOR TO SPENCER KELLOGG, SPENCER KELLOGG, JR., AND HOWARD KELLOGG, OF BUFFALO, NEW YORK, A FIRM.

DRIER.

1,291,185.  Specification of Letters Patent.  Patented Jan. 14, 1919.

No Drawing. Application filed May 2, 1910, Serial No. 558,945. Renewed October 5, 1917. Serial No. 194,986.

*To all whom it may concern:*

Be it known that I, ALEXANDER SCHWARCMAN, a citizen of the United States, residing at Buffalo, in the county of Erie and State of New York, have invented certain new and useful Improvements in Driers, of which the following is a full, clear, and exact specification.

My invention relates to driers for paints, varnishes, oils, and oil compounds.

The object of my invention is to provide an improved drier and an improved method of manufacturing the same.

The present improvement in the art of producing driers results in not only reducing the cost of production and increasing the efficiency of the drier, but it gives a light-colored drier rich in metallic salts.

Previous to my invention it was usual, in preparing driers, to combine linseed oil with lead or manganese, or both, by boiling the same in an open kettle, but the driers thus produced are more or less objectionable owing to their dark color and are of limited efficiency owing to the relatively small amount of solid chemicals which can be combined with the oil.

In the usual process, a portion of the glycerin radical in the neutral oil is oxidized to acrolein and the fatty acids set free are combined with the lead and manganese to form the driers, which, so obtained, contain from two to five per cent. of the solid chemicals.

In practising my process, however, the free fatty acids are split under pressure and the lead and manganese are taken up immediately, the glycerin formed being readily separated from the material under treatment. The product obtained is of very light color and can be produced in any degree of concentration.

One method of carrying out my invention is as follows:

One thousand parts of raw or refined oil are mixed with fifty parts of black oxid of manganese, fifty parts of litharge, and five hundred parts of water. The mixture is thoroughly churned and heated in an autoclave to about 260 to 320 degrees F., under a pressure of 150 to 175 pounds, for two or three hours. Under these conditions a splitting of the oil takes place, caused by the action of the lead and water, the glycerin radical taking up from the water its lacking hydrogen and separating out as glycerin, a portion of the quantity of fatty acids combining with the present lead or manganese as a salt. The exclusion of the air during the splitting of the oil and the incorporation of the metallic base prevents oxidation of the product. The product is for this reason light-colored.

The resultant glycerin by-product may be readily separated from the main product in some suitable manner.

By varying the proportions of lead and manganese with respect to the oil, it is possible to obtain any degree of concentration desired, and thus any degree of efficiency in the product, and I do not mean to limit myself to any particular proportions as to the oil or metallic compound.

While I prefer to employ equal parts of manganese and lead oxids, it will be understood that the relative proportions of these substances may also vary according to the character of the product desired, and it will also be understood that instead of using both metals, either the lead or the manganese may be employed alone, although I prefer to use both, as above stated.

While I prefer to use oxids of the metals above mentioned, I do not wish to be understood as limiting myself to such use, as other forms of these metals may be found to act satisfactorily, and my invention contemplates the use of any such as may be satisfactory.

It is obvious that many modifications and changes may be made in my invention without departing from the spirit thereof, and I do not mean to limit myself to the particular formulæ or features described, but what I claim and desire to secure by Letters Patent is:

1. The method of manufacturing driers, which consists of combining basic lead and manganese compounds with a drying oil under pressure.

2. The art of manufacturing a drier, which consists of subjecting a mixture of a drying oil, water and a metallic base to the influence of heat and pressure.

3. The method of producing a drier, which consists of heating a drying oil, water, and basic compounds of manganese and lead in a closed vessel.

4. The art of manufacturing a drier, which consists of forming a mixture of raw linseed oil, black oxid of manganese, litharge and water, agitating such mixture, subjecting such mixture to heat and pressure, and then separating the resultant products.

5. The art of manufacturing driers, which consists in treating a mixture of a drying oil, basic metallic compounds and water so as to cause the oil to split into free fatty acids and glycerin, the former combining with the metallic compounds and the latter mixing with the water, and separating the water and glycerin from the drier.

6. The art of manufacturing a drier, which consists of forming a mixture consisting of substantially 1000 parts of oil, 50 parts of black oxid of manganese, 50 parts of oxid of lead, and 500 parts of water, then agitating the mixture, then subjecting the same to from 260 degrees to 320 degrees F., at a pressure of from 150 to 175 pounds, causing the fatty acids and the glycerin radical to split and these respectively to combine with the metallic oxids and the water, and then separating the resultant combinations.

7. The method of manufacturing a drier, which consists in mixing a drying oil, water and basic metallic compounds, causing the metallic base to combine with fatty acids split from a part of the oil, the glycerin radical liberated combining with the water, and separating the water and glycerin from the drier and oil.

8. The method of manufacturing driers for drying oils, consisting in heating a mixture comprising a drying oil, water and a metallic base under pressure and at a temperature sufficient to cause said base to combine with the fatty acid constituent of a larger proportion of said oil than that with which combination will take place at normal boiling temperatures of the oil.

9. The method of manufacturing driers which consists in combining lead and manganese compounds with a drying oil under pressure in the presence of an excess of oil.

10. A concentrated, light-colored drier for drying oils, comprising a drying oil combined with a metallic base in the presence of an excess of oil, the proportion of said base to the total quantity of oil being in excess of that normally combinable with said oil at normal boiling temperatures.

11. The drier produced by the herein described process consisting of a compound of a metallic base with the free fatty acids of a drying oil and characterized by light color and a high percentage of the metallic constituents.

12. The drier produced by the herein described process consisting of a compound of a metallic base with the free fatty acids of linseed oil and characterized by light color and a high percentage of the metallic constituents.

13. The drier produced by the herein described process consisting of a body of light colored linseed oil having combined with the free fatty acids split from a part of said oil, a metallic base and characterized by light color and a high percentage of the metallic constituents.

14. The art of manufacturing a drier, which consists of subjecting a mixture of a drying oil, water and a metallic base to the influence of heat.

15. The method of producing a drier which consists of heating a drying oil, water, and basic compounds in a closed vessel.

In witness whereof I have hereunto set my hand in the presence of two subscribing witnesses.

ALEXANDER SCHWARCMAN.

Witnesses:
Wm. H. Almy,
William B. Capron.